US006950013B2

(12) United States Patent
Scaman et al.

(10) Patent No.: US 6,950,013 B2
(45) Date of Patent: Sep. 27, 2005

(54) INCIDENT RECORDING SECURE DATABASE

(76) Inventors: Robert Jeffery Scaman, 9482 S. Garden Ct., Highlands Ranch, CO (US) 80126; Jeffrey Allen Hamilton, 6034 S. Willow Way, Greenwood Village, CO (US) 80111

( * ) Notice: Subject to any disclaimer, the term of this patent is extended or adjusted under 35 U.S.C. 154(b) by 226 days.

(21) Appl. No.: 10/158,837

(22) Filed: May 31, 2002

(65) Prior Publication Data

US 2002/0145666 A1 Oct. 10, 2002

Related U.S. Application Data

(63) Continuation-in-part of application No. 09/758,645, filed on Jan. 10, 2001, which is a continuation-in-part of application No. 09/327,828, filed on Jun. 8, 1999, now Pat. No. 6,211,907, which is a continuation-in-part of application No. 09/088,267, filed on Jun. 1, 1998.

(51) Int. Cl.[7] .............................................. B60Q 1/00
(52) U.S. Cl. ..................... 340/436; 340/438; 348/143; 348/148
(58) Field of Search ................................ 340/506, 517, 340/438, 436, 426.18, 441; 701/4, 35; 705/400; 348/22, 143, 148

(56) References Cited

U.S. PATENT DOCUMENTS

| | | | |
|---|---|---|---|
| 1,733,783 A | 10/1929 | Medina | 396/427 |
| 3,349,679 A | 10/1967 | Lohman, III | 396/427 |
| 3,752,047 A | 8/1973 | Gordon et al. | 396/263 |
| 4,420,238 A | 12/1983 | Felix | 396/427 |
| 4,789,904 A | 12/1988 | Peterson | 386/1 |
| 4,843,463 A | 6/1989 | Michetti | 348/148 |
| 4,992,943 A | * 2/1991 | McCracken | 701/35 |
| 5,027,104 A | 6/1991 | Reid | 340/541 |
| 5,111,289 A | 5/1992 | Lucas et al. | 348/148 |
| 5,144,661 A | 9/1992 | Shamosh et al. | 348/143 |
| 5,185,667 A | 2/1993 | Zimmermann | 348/207.99 |
| 5,282,182 A | 1/1994 | Kreuzer et al. | 396/21 |
| 5,319,394 A | 6/1994 | Dukek | 348/148 |
| 5,406,324 A | * 4/1995 | Roth | 348/22 |
| 5,455,625 A | 10/1995 | Englander | 348/375 |
| 5,491,464 A | 2/1996 | Carter et al. | 340/425.5 |
| 5,570,127 A | 10/1996 | Schmidt | 348/148 |
| 5,638,273 A | 6/1997 | Coiner et al. | 701/35 |
| 5,677,979 A | 10/1997 | Squicciarini et al. | 386/46 |
| 5,689,442 A | 11/1997 | Swanson et al. | 380/241 |
| 5,731,785 A | 3/1998 | Lemelson et al. | 342/357.07 |
| 5,797,134 A | * 8/1998 | McMillan et al. | 705/400 |
| 5,798,458 A | 8/1998 | Monroe | 73/587 |

(Continued)

*Primary Examiner*—Toan N. Pham
(74) *Attorney, Agent, or Firm*—The McCallum Law Firm LLC; Jennifer M. McCallum Esq.

(57) ABSTRACT

A device and method for permanently and securely storing incident information, relating to a vehicle, from remote download to create a secure non-tamperable, permanent database of criminal activity and/or accident evidence for evidentiary purposes. The information may be directly transferred to an information center and/or the authorities through a transmission link, which is preferably a satellite up/link-down/link or saved directly onto the downloading device for transfer to the secure device. The remote downloading device may be activated automatically or upon a trigger signal and comprises an interface, an information capturing storage device, a video monitor display and preferably a transceiver. The interface communicates with an information storage device, downloads the information saved therein and transmits it to the capture storage device, transceiver or both. The received information is reproduced, integrated into an indexed database and transferred to the secure device as part of a secure, indexed database for non-tamperable permanent storage as evidence.

83 Claims, 4 Drawing Sheets

U.S. PATENT DOCUMENTS

| | | | |
|---|---|---|---|
| 5,815,093 A | 9/1998 | Kikinis | 340/937 |
| 5,847,661 A | 12/1998 | Ricci | 340/902 |
| 5,926,210 A | 7/1999 | Hackett et al. | 348/158 |
| 5,935,190 A | 8/1999 | Davis et al. | 701/119 |
| 6,037,977 A | 3/2000 | Peterson | 348/148 |
| 6,141,611 A * | 10/2000 | Mackey et al. | 701/35 |
| 6,147,598 A | 11/2000 | Murphy et al. | 340/426.19 |
| 6,163,277 A | 12/2000 | Gehlot | 340/905 |
| 6,163,338 A * | 12/2000 | Johnson et al. | 348/148 |
| 6,246,933 B1 * | 6/2001 | Bague | 701/35 |
| 6,630,884 B1 * | 10/2003 | Shanmugham | 340/436 |
| 6,718,239 B2 * | 4/2004 | Rayner | 701/35 |

* cited by examiner

US 6,950,013 B2

INCIDENT RECORDING SECURE DATABASE

The present application is a Continuation-in-Part of application Ser. No. 09/758,645 filed Jan. 10, 2001 for Incident Recording Information Transfer Device which is a Continuation-in-Part of application Ser. No. 09/327,828 filed Jun. 8, 1999 for a "Secure, Vehicle Mounted, Surveillance System" now U.S. Pat. No. 6,211,907 issued Apr. 3, 2001, which is a Continuation-in-Part of application Ser. No. 9/088,267 filed Jun. 1, 1998, for a "Secure, Vehicle Mounted, Incident Recording System". The parent application, which is incorporated by reference in its entirety, discloses an on-board, vehicle incident recording system for producing a secure, permanent record of vehicular accidents for evidentiary purposes and downloading the permanent record through on site or remote means, such as through a wireless transmission.

BACKGROUND OF THE INVENTION

1. Field of the Invention

The first continuation-in-part application, which is incorporated by reference in its entirety, discloses an on-board, vehicle surveillance system, such as for a truck or an airplane for producing a secure, permanent record of criminal activity relating to the vehicle for evidentiary purposes, which may be transferred directly to an information center and/or the authorities via a transmission link, which is preferably a satellite up/link-down/link.

The second continuation-in-part application, which is incorporated by reference in its entirety, is directed to an on-board, vehicle surveillance system having a remote information download and transfer device for downloading a secure, permanent record of criminal activity and/or accident evidence for evidentiary purposes.

The instant invention is broadly directed to tamper-proof data repository for retaining a database of information from an on-board, vehicle surveillance system and, more particularly, to a secure, integrated, indexed, database of recorded information which can be downloaded and transferred to a repository as a permanent record of criminal activity and/or accident evidence for evidentiary and/or actuarial purposes.

2. Discussion of Related Art

Our country is in the throws of a security crisis. Devices and methods for making our way of life more secure, without ultimately destroying our cherished right to privacy are being sought. Because of our constitution and its guarantee of freedoms, such security systems must preserve gathered evidence in a manner that its chain of title can be traced from gathering to the courtroom and beyond. Thus, unobtrusive surveillance, which preserves the integrity of the evidence gathered in a secure retrievable database, is needed.

The integrity of the database must be of a quality that judicial proceedings can proceed using the information contained therein while protecting its integrity from acts of terrorists and others that would seek to destroy such evidence to prevent prosecution or public censure. In our prior applications, the security of the database as an evidentiary source was disclosed in respect to a secure, vehicle mounted, surveillance system, which is an onboard video data system for recording incidences in which the vehicle is involved such as an automobile accident, truck jacking, plane hijacking or the like. The secure, vehicle mounted, incident recording system produced secure evidentiary data about incidents in and around a vehicle such as an aircraft cabin. With the advent of terrorism, the requirement for tamper proof secure data repositories to store evidence in the form of a database has increased.

In addition to judicial proceedings, insurance carriers are continually looking for ways to reduce losses as well as the cost associated with handling claims. In our prior applications, we addressed the losses associated with vehicular mishaps and vehicular vandalism and/or theft. Each year there are over 35 million on-the-road accidents in the United States alone. There are many other vehicles, including watercraft, aircraft and off-road vehicles, which also are involved in mishaps. These can vary from one vehicle to multi-vehicle incidents. These mishaps or accidents cause billions of dollars of property and personal injury damage every year. In most cases, one or more of the parties is at fault, and law enforcement officers, insurance adjusters, and the like are required to find credible witnesses to re-account the factual evidence so that culpability and liability may be accurately determined. Even in aircraft incidents, it is important for the insurer to know (or rule out) the cause of the accident.

Likewise, each year, theft and vandalism of vehicles account for losses that approach the magnitude of those resulting from accidents. These also are insured losses that must be handled by insurance carriers. In many cases, however, the loss either is caused by carelessness or is in fact an "inside job." The insurance industry, which is responsible for investigation and replacement or coverage of the losses, spends millions of dollars investigating such activity, as well as billions of dollars in replacing or compensating policyholders for avoidable losses.

In both of the above scenarios, the recording, storage, and remote access of secure information relating to the events of an accident, theft or acts of terrorism which later can be used as reliable evidence, would be very beneficial in bringing terrorists to justice, stream lining accident and vehicle insurance claims to ensure that only valid claims are compensated, and in expediting the investigation of an accident or theft, providing accurate medical attention in the event of an accident, assisting in the apprehension of perpetrators, and locating and retrieving stolen vehicles and cargo.

With respect to the Secure, Vehicle Mounted, Incident Recording System, the ability to download and produce a database of the secure information, including transmitting this information to produce an off-site database at a permanent off-site location is particularly helpful in expediting insurance claims because the adjuster's presence at the scene of the accident is not required, nor would the adjuster be required to analyze the damaged vehicle in order to ascertain fault. Instead, the secure information downloaded from the Secure, Vehicle Mounted, Incident Recording System could be reviewed easily and quickly and a determination of fault could be made. Further, it would be helpful if the authorities, rescue workers, hospitals, and the like could download the information en route to an accident scene, or at the scene itself, in order to ascertain the extent of the damage, fault, the equipment required (i.e., tow truck, jaws of life, etc), and the extent and cause of any injuries.

With respect to the on-board, vehicle surveillance system, such as for a truck or an airplane, authorities could produce a secure, permanent database of criminal activity relating to the vehicle for evidentiary purposes which may be transferred directly to an information center and/or the authorities via a transmission link which is preferably a satellite up/link-down/link. The database would be secured by assuring limited "keyed" access only to authorized persons.

The advantages of this secure database in a repository are numerous. The repository will be a permanent storage site for very sensitive and important data. Namely vehicular accident video files and criminal incident video files relating to vehicles including terrorist activity. The sensitive nature of the data will require the system to be completely secured so as to provide unimpeachable evidence as to circumstances surrounding accidents and criminal incidents in order to stand up under scrutiny in a courtroom setting. Video files of traffic accidents and criminal incidents stored in this repository would be available to judges and juries and will provide an unimpeachable record of the events in question. In addition, this secure database would be available to provide statistical evidence for asserting and defending premium rates before state regulatory agencies.

In addition to securely storing this database, the system will be capable of quickly transferring this data to third parties in need of the information, such as insurance companies and law enforcement agencies via numerous data transmission techniques. Another utility of this repository will be scientific, video analysis of vehicular accidents from different angles, which will allow investigators to quickly and accurately determine the cause of an accident and important factors surrounding the circumstances of the accident. This will also allow vehicle manufacturers and traffic engineers to build safer vehicles and highways in the future, thereby mitigating accidents, reducing injuries and saving lives.

Therefore it would be advantageous to have a remote device that could securely access, remotely or on site, the database of information being generated and/or securely stored on the Secure, Vehicle Mounted Incident Recording System and/or the On-Board, Vehicle Mounted Surveillance System, download that information, and instantaneously transmit the information via a transceiver to authorities, rescue vehicles, hospitals, and/or to an off-site storage location while maintaining the integrity of the information in a secure, limited "keyed" access database for future use as criminal or civil evidence or for actuarial use. The transmission could be real time or delayed. Further, it would be advantageous to have a device that incorporated a video output interface to a display screen monitor such that a police officer, rescue unit, hospital, or the like could actually view the incident in order to provide better assistance. In addition, it would be advantageous to have a device that the video output display could download, transmit, and display information regarding certain physical phenomenon associated with a criminal act such as a hijacking or theft or a vehicular accident, such as vehicle dynamic information including position, speed and acceleration, as well as audio, and the like, that had been monitored and recorded by the recording system and could be utilized by police, hospitals, rescue workers, and the like in ascertaining certain information, such as the extent of any injuries, determination of fault in an accident, whether a crime is ongoing, and the proper equipment needed for a particular incident.

SUMMARY OF THE INVENTION

An integrated, indexed database of evidence quality information is stored in a secure data repository designed for the reception and permanent storage of information from a remote information recording system has now been discovered. The database is a compilation of indexed recording system information having a verifiable, traceable, chain of title. The indexing can include record identification parameters added to the file to facilitate retrieval by authorities. The limited access storage facility is tamper proof. In one embodiment, only physical access to the stored information in the repository is present. In this embodiment data in "clean" transfer devices is physically down loaded to the repository and access to the database is provided only by, for example, retina scan or the like. In another embodiment data access for information storage is transmitted through a super firewall, which evades hacking and viruses. In another aspect a transfer device for accessing, receiving and/or downloading information from a Recording System, and transmitting the information to a remote station or storage facility for indexing and transfer to the secure repository is provided. The invention further contemplates an off-board downloading device for accessing information on a recording system and for viewing and/or transferring that information to an off-site location for indexing, and integration into a data base for transfer to a secure permanent storage facility.

For the purpose of clarity, this description is directed to the use of the remote information access and transfer device with a single Recording System. The remote information access and transfer device of the instant invention, however, can function equally well with either a single Recording System or with a multiplicity of Recording Systems.

In a preferred embodiment, the device is capable of receiving downloaded secure, encrypted information and non-encrypted information for transmitting and storing the downloaded information at an off-site location. To enable real time viewing of the downloaded information, an off-board video output interface is provided to display the incident that is downloaded on a display screen or monitor, thereby providing certain audio/video feedback or physical and/or dynamic information, such as the orientation, position, speed and acceleration of a vehicle, the location of vehicles and/or people, impact parameters, information regarding the positions of the vehicle controls such as brakes, gears, steering wheels, lights, windshield wipers, and the like, that may facilitate investigation of the incident prior to the information being permanently stored. The device is further capable of securely storing the downloaded audio information associated with incidents recorded and stored by a Recording System. The integrated database is indexed for recovery without altering the validity of the recorded information. Thus, information such as insurance policy number, drivers' names, police report number and the like can be used for indexing purposes to facilitate retrieval.

In a preferred aspect, the remote downloading device used to acquire the data to be permanently stored, has at least one transceiver for accessing, downloading, and remotely transmitting information to an off-site location, such as a base station, a hospital, an insurance company, law enforcement, a rescue vehicle, or the like. The transceiver receives signals from a remote unit, such as a Recording System, which allows the device to transmit recorded and/or stored information directly from the safe box or hard drive located on the Recording System to an off-site location and/or instantaneously as it is generated. The transmitter may transmit the information via tower, radio wave, satellite bandwidth, or the like.

In another embodiment, the information gathering unit has a direct transfer, solid state repository, such as a flash memory, a hard disc drive, or the like, for allowing the downloaded information to be stored directly in the downloading device as well as, or instead of, being stored at the remote storage facility. The information thus stored is transferred to an offsite location for indexing and integrating into a database, which then may be transferred to a secure repository.

In another aspect, the information gathering unit has a video output interface to a display screen or monitor, such as an LCD display screen for example, so that a user can transport the remote information access and transfer device to the scene of an accident or crime, for example, to establish a remote, wireless communications link with the Recording System at the scene and to view the scene in real time and/or as it was recorded and stored by the Recording System. In this way, law enforcement, medical personnel, or other emergency and rescue personnel can view an incident occurring at a remote location, such as at the scene of an accident or a crime for example, while en route to the scene, while assistance is being rendered to a victim, or while a perpetrator is being pursued. Additional information pertaining to certain physical phenomena, such as vehicle speed, braking distance, time of the incident, audio recordings, and the like, can accompany the video output to permit rescue workers, medical personnel, and police officers, for example, to ascertain such things as the extent of any injuries, fault, the types of rescue devices required, and/or whether a suspected perpetrator is armed. In one embodiment, a GPS tracing identifier is captured on the information transmitted to the off site location to exactly independently track the location of the incident and record the information to be integrated into the database.

Other objects, features, and advantages of the present invention will become apparent to those skilled in the art from the following detailed description. It should be understood, however, that the detailed description and specific examples, while indicating preferred embodiments of the present invention, are given for purposes of illustration and not of limitation. Many changes and modifications within the scope of the present invention may be made without departing from the spirit thereof, and the invention includes all such modifications.

BRIEF DESCRIPTION OF THE DRAWINGS

The above and further objects of the invention will become more readily apparent as the invention is more fully understood from the detailed description to follow, with reference being made to the accompanying drawings in which like reference numerals represent like parts throughout and in which.

DESCRIPTION OF EXEMPLARY EMBODIMENTS

Figure 1:
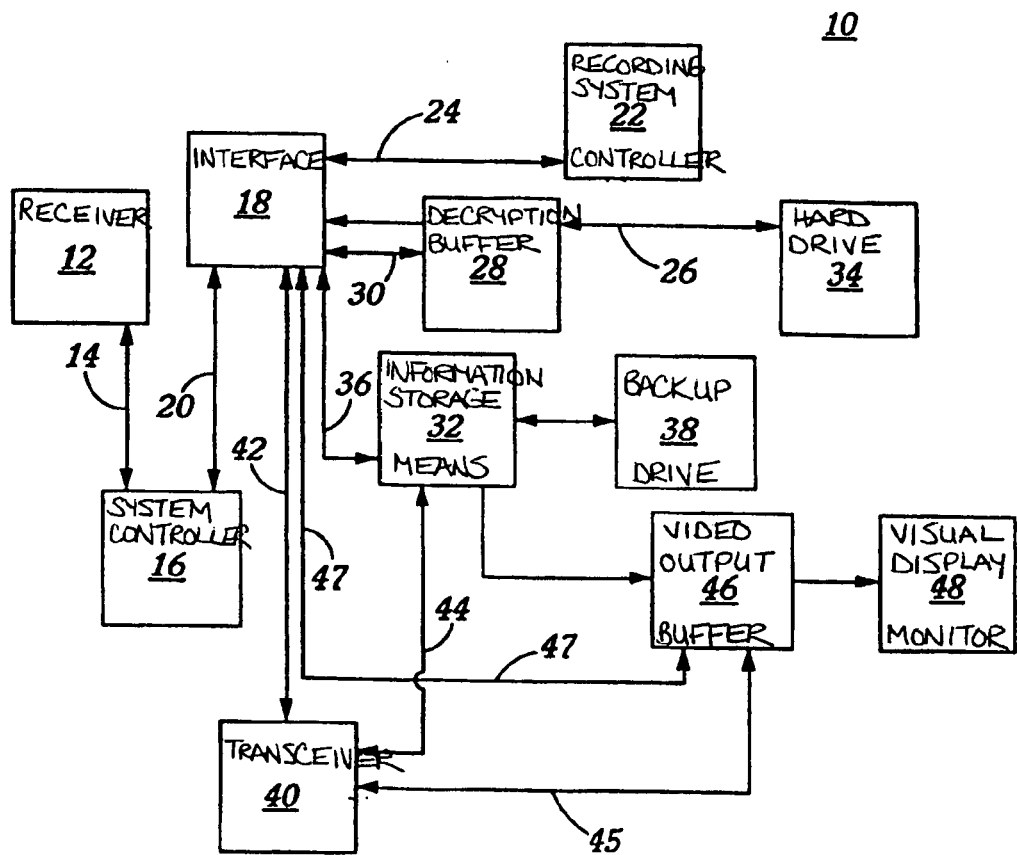
FIG. 1 is a schematic illustration of the recording/transfer system/or use with the instant invention.

The database of the instant invention includes vehicle information from the Recording System integrated into a permanent, verifiable indexed record. The indexed database is stored in a secure non-tamperable repository by physical transfer or electronically through a super firewall. The video/audio/data files, in their original, secure, encrypted format, are integrated and indexed. The parameters used as index identifiers can be part of the information file, such as the date or the like, or can be added to the file subsequently without compromising the integrity of the data, such as policy number, driver license info or the like. The indexing for retrieval is possible based upon numerous parameters including but not limited to: Vehicle Identification Number, Date of Accident/incident, Owner's name, Unit Serial Number, GPS location, Street names, Address of Incident, City Location of Accident, State Location of Accident, Vehicle Manufacturer, Vehicle Model, Vehicle Year, Insurer, Policy number, Driver's License Number, Driver Name, Date of last access, Name of last User, Company of last user, Type of Incident, i.e. crash, theft, hit and run etc., Type of crash, i.e. head-on, rollover, rear-end, T-bone, 1-car, 3-car, Road conditions, i.e. snow, rain, gravel road, ice, purpose of access, In accordance with the invention the retrieval/storage index parameters can be layered or embedded such that for example "quick searches" for example with the VIN or Owner Name can be run or information searches on the data ("advanced searches") can be run. The indexing options also need not be stagnant and can be expanded as need arises. In accordance with the secure aspect of the database, access to the data will also be recorded and indexed to assure authorized access and retrieval thus assuring the integrity of the data.

The initial collection of the secure downloaded data, the integration into a secure data base and the indexing and permanent archiving of the data will allow, secure, evidence quality, unprecedented information to assist investigators, emergency personnel, auto manufacturers, traffic engineers and government agencies in reducing injuries, deaths and crime.

The secure database of the instant invention is capable of generation by physical or electronic transfer. Preferably, the database is contained in an off line secure location to prevent tampering or sabotage. The database of the instant invention provides a chain of obtained evidence from the incident to the courtroom or other means of dispute resolution involving the veracity and authenticity of the data. The database of the instant invention is meant to be verifiable, comprehensive, secure and permanent.

The remote Recording system and information access and transfer device, used to capture the information to be stored in accordance with the present invention, is capable of accessing a remotely located recording system and downloading information to the remote information access and transfer device from the recording system either instantaneously or upon up-link command. The information can be downloaded from the Recording System in a variety of ways, including instantaneously, at various set intervals, in response to certain events, and/or in response to remote commands. The information on the recording system can be accessed by the device either in real time, as the incident is being recorded, or after the incident has been recorded and stored on the recording system for securely capturing and storing vehicular accident video files and files relating to incidents occurring in or around a vehicle, with specific relevance to the secure vehicle mounted incident recording system. Alternatively, the information can be downloaded directly from the secure vehicle mounted incident recording system.

The information gathered will become a completely secure database housed within the permanent secure repository and will be used to store and transmit information files to third party entities such as insurance companies, law enforcement agencies and governmental authorities. An intermediate collection repository will utilize various means of data reception and transmission including the Internet, World Wide Web, local area networks, telephone lines, cellular networks, fiber optic cables, satellite transmission or any other form of communication means by which data can be transferred. The repository can utilize advanced data encryption and security techniques to assure the secure reception, storage and transmission of the data, thus assuring the integrity of the video/audio files and data to be processed. The database can be used for analysis of accident and criminal video files for evidentiary purposes in resolving vehicular accident and criminal activities.

The remote information access and transfer device used to gather data in accordance with the instant invention, comprises a portable computer system having information input means for entering commands and information used in accessing and communicating with a remote recording system; and a transceiver for receiving, downloading, and transmitting information from a Recording System. In one embodiment, the device further comprises a visual display for viewing information downloaded from a Recording System.

The transfer device further comprises temporary information storage and compressing means for storing information downloaded from a Recording System. The information storage means can be free-standing or mounted in a vehicle, such as a police car or other rescue vehicle for example, or can be utilized from a stationary facility, such as a hospital, a police station, or an insurance company office for example, for downloading, viewing, and instantly transmitting the downloaded information to be stored in the database of the secure, off-site location in accordance with the instant invention. In an effort to protect the integrity of the transmitted information, the transceiver is located upstream of the Recording System safe box or hard drive, and the downloaded information is transmitted simultaneously to an off-site location to be integrated into the secure database. Thus, the transceiver on the device communicates directly with the Recording System to transmit the information to an off-site location as the information is being downloaded to the device and prior to the user being able to view the information via the display screen. This also allows for the information to be transmitted to the remote location and viewed in real time. The device is triggered to download and transmit information from a Recording System in a variety of ways, such as, for example, on a real time basis, based on preset commands, based upon the occurrence of a predetermined event, and/or in accordance with transmitted instructions or commands. The downloaded information is transmitted or broadcast to the remote location, which can be the holding point for generating the secure database through a transmission link. The transmission link is preferably a direct satellite up/link-down/link, but the link also can be accomplished through a modem, a cell phone, radio frequency (RF), infrared, or any other means for transmitting information, as made available through advances in the relevant technology and as practiced in the art, such as for example a LAN, WAN, wireless network and the like.

In another aspect of the invention, electronic access codes and encryption keys are utilized to provide authorized access, and to prevent unauthorized access, to the information stored in the safe box of the Recording System. The downloading device has a limited access interface, such as a direct plug-in LED for example, for entering access codes or encryption keys to communicate with the Recording System. Once the access codes or encryption keys are received and accepted by the Recording System, the device downloads the information and transfers the information onto a carrier wave for storage for example at the secure, remote facility of the instant invention. The device re-encrypts the downloaded, de-encrypted information so that the information remains encrypted once it is downloaded, transmitted, and stored so that the integrity of the information is maintained and tampering is prevented. It will be realized that the encrypted information can be transferred directly in encrypted form to eliminate the necessity of re-encrypting the information.

Turning to the drawings, there is shown in FIG. 1 a downloading device for use with the instant invention as the secure link to generate the secure database. This figure is a schematic wherein the downloading device 10 is remotely located from the Recording System. The downloading device is preferably a remote stationary location but can be mounted in a police cruiser, rescue vehicle dispatch center or the like. In the described embodiment, upon activation, a receiver 12 communicates with the system controller 16 via link 14 to request access codes and/or encryption keys. The system controller 16 communicates with interface 18 via link 20 to activate the transmission of the access codes or encryption keys to the Recording System controller 22 located on the Recording System via code access link 24 for verification.

Upon receipt of the verification of access codes or encryption keys from the Recording System controller 22 via code access link 24 to the interface 18 and via link 20 to the system controller 16, the system controller 16 triggers the interface 18 to begin downloading the information from hard drive 34 located on the Recording System through information stream link 26. The interface 18 is directly connected to a decryption buffer 28 via information junction link 30 which can encrypt or decrypt the information stored on the hard drive 34.

As the interface 18 accesses the information stored on the hard drive 34 located on the Recording System, the information is encrypted or decrypted by the decryption buffer 28, and then downloaded via information stream link 26. The interface 18 stores the information on the download device 10 by directly communicating with the download device's information storage means 32 via link 36. The information storage means 32, which has the capacity to store the information for 48 hours or more, records the encrypted or unencrypted information accessed by the interface 18. Hard disk storage is preferred for large capacity. Any configured hard disk device can be used for example, a Seagate UDMA 8.6 GB hard drive. Additionally tape drive storage can be used either as primary or backup. The information storage means 32 is controlled by the system controller 16 to activate the information storage means 32, play back recorded information, find referenced events, decode the stored information and the like. This permits authorities at the scene of an accident or crime to be in full control of the information storage means 32 located in the downloading device so that they may reconstruct and view information on sight or en route, and monitor any previous incident recorded by the Recording System. Preferably, the system controller 16 prohibits recording over a previously downloaded portion of the information, prior to the drive space being released to the downloading device 10. In this manner a permanent, non-corrupted record is retained on the downloading device 10. The system controller 16 remembers the point on the disk where the prior recording was terminated and will index to that point on the disk, prior to the resumption of recording, in response to the activating of the downloading device 10. The information storage means 32 also communicates with a backup disc or tape drive 38 which provides for the information to be removed from or copied from the information storage means 32 either in encrypted or non-encrypted form onto a transferable tape or disk. The tape or disk can then be transported to another location, such as, for example, a hospital for viewing by medical personnel treating an accident victim.

The interface 18 also directly communicates with transceiver 40 via first transmission link 42. This interface allows real time transmission of data, simultaneously with storage. The transceiver 40 can comprise a direct satellite uplink, RF radio, modem, cell phone, or the like. In accordance with this embodiment, the transceiver 40 can receive remote signals which allows the interface 18 of the download device 10 to directly transmit the information simultaneously as it is being downloaded from the hard drive 34 located on the Recording System. The download device's information storage means 32 can also communicate with the transceiver 40 via transmitting link 44 so the information can be transmitted, via the transceiver 40, to a remote location after it is stored on the download device's information storage means 32. This encrypted information is securely stored for integration into the secure database. Additionally, the transceiver 40 can communicate with the Recording System directly in order to transmit the information in real time to an off-site location or directly to the video output buffer 46 via second transmission link 45 for viewing in real time, on the visual display monitor 48.

In operation, the information gathering system of the instant invention can operate in many modes from real time transmission to a remote location to transmission of stored information upon command. All of these modes can be used as the source of the secure information to be transferred to the secure database of the instant invention. In one aspect these alternatives can be stored separately to authenticate the information download prior to secure database storage.

For example, a police officer, who is en route or arrives at the scene of an accident or vehicle theft can access the information pertaining to the incident stored in the safe box of the Recording System and watch a video replay at the scene by inputting access codes or encryption keys into the keyboard of the information transfer device. The codes will be transmitted to the Recording System by the interface. Upon their authentication, the downloading device will communicate with the Recording System in order to download the information onto the download device. The downloading device also communicates with a transceiver unit in order to transmit the information to an off-site location. The information can then be displayed via the video output interface onto a visual display screen. Attendant with recorded information displayed on the visual display screen may be audio and other information on such physical phenomena as the speed of the vehicle, brake distance, time of the accident, video information, etc. The information may thereafter be saved into the downloading device's information storage means.

In another aspect, the download device 10 will contain a unique encryption key that may be accessible by a remote station so that the transceiver 40 of the downloading device 10 can be activated remotely to start transmission download at any time from either the interface 18, the information storage means 32 or the hard drive 34.

The interface 18 also communicates directly via third transmission link 47 or via the information storage means 32 with a video output buffer 46. The video output buffer 46 is connected to a visual display monitor 48. The visual display monitor 48 is preferably a color LCD display but can be a CRT or other screen-type monitor. The visual display monitor 48 provides for the information downloaded from the information storage means 34 located on the Recording System to be viewed on the scene or en route by for example, authorities trying to apprehend a perpetrator or medical personnel trying to provide medical attention to an accident victim.

In another embodiment, the information recorded from certain monitors and transducers located on the Recording System can be downloaded by the interface 18 from hard drive 34 located on the Recording System and superimposed on recorded video information also downloaded from hard drive 34 located on the Recording System. This additional information can be stored on downloading device 10 information storage means 32, on transferable disk or tape, transmitted to an off-site location via transceiver 40 or can be transmitted along with the video signals via the video output buffer 46 and displayed on the visual display monitor 48.

Figure 2:
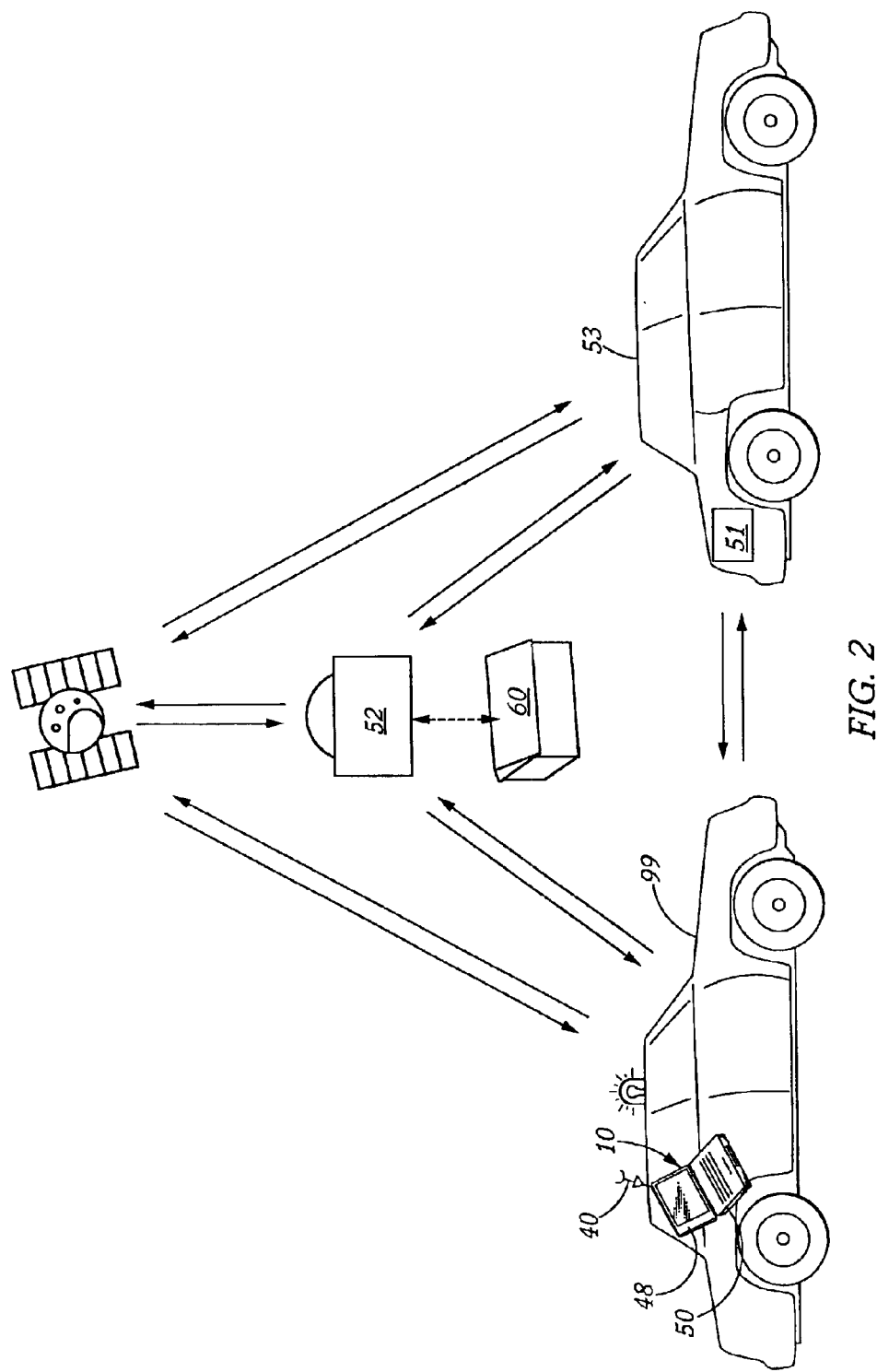
FIG. 2 is a component location in accordance with an exemplary embodiment of the instant invention.

Turning to FIG. 2, there is shown a component location diagram in accordance with an exemplary embodiment of the instant invention. In this exemplary embodiment, the download device 10 is implemented in a form that is similar to that of a laptop computer with a visual display monitor 48 and keyboard 50. The download device 10 may be self-contained with, for example, a phone jack and/or a modem hooked to a mobile phone or SET for direct satellite transmission via transceiver 40 as shown. In the depicted embodiment, the Recording System 51 is located in a vehicle 53, and the download device 10 is located remotely from the Recording System 51 such as, for example, in a police cruiser 99. One with ordinary skill in the art appreciates that the download device 10 could also be located in a wide variety of other mobile locations, including an emergency vehicle such as a fire truck, ambulance or the like, or in a military vehicle such as a plane, tank or helicopter, or in the vehicle of an insurance adjuster, a fleet manager, or a site manager. Alternatively, the download device 10 could be implemented in a variety of packaging configurations to enhance its mobility, for example to be carried by hand or in a carrying case or even a knapsack or a backpack. Of course, the download device 10 could also be implemented as a stationary fixture as well.

In the exemplary embodiment of FIG. 2, the download device 10 is activated to retrieve the vehicle information by a command entered via the keyboard 50 or alternatively, as a result of a transmission trigger from a Recording System 51. The occurrence of a predetermined event or series of events or even the failure of the occurrence of an event or series of events may trigger the downloading transmission. Additionally, as one with ordinary skill in the art appreciates, a download may be triggered by satisfaction of, or the failure to satisfy, a variety of logical criteria relating to the vehicle or its surrounding environment and/or its contents including, for example, position, velocity, acceleration, direction, time, temperature, pressure, mechanical deformation, chemical presence or exposure, sound, proximity, conductivity or other electrical properties, magnetic or electromagnetic field strength or orientation or other magnetic or electromagnetic properties, or radioactivity, or any combination thereof.

Upon activation, the information, which can be recorded information and/or live information, can be transmitted from the Recording System 51 to a secure location 52 or, upon request, simultaneously to the download device 10, which, in this case, is located in the police cruiser 99. Utilizing access codes, the download device 10 may alternatively retrieve the information from the Recording System 51 or the secure location 52. Further, one with ordinary skill in the art appreciates that the transmissions of information in each case, whether from the Recording System 51 to the download device 10 or to the secure location 52, or from the secure location 52 to the download device 10, or from the download device 10 to the secure location 52, may be via tower, radio wave, satellite band width, or the like. As the information is downloaded, the visual display monitor 48 can display the video information, and the download device 10 can play audio or other information as desired, either on the scene or en route to the scene or from any other desired vantage point chosen, for example, for safety or convenience or comfort. The transceiver 40 can also communicate directly with a Recording System 51 in order to transmit the information instantaneously, or in real time, to a secure location 52 through a transmitter or transceiver and/or via satellite 56 or other means, which are readily understood by one skilled in the art.

Whether remotely or directly downloaded to secure location 52, once the information is received in secure location 52, it is processed for permanent storage as an integrated, verified, indexed database in secure storage facility 60. The data is cataloged, tagged, encrypted, and compressed. In some cases additional indexes information is layered on the files as previously described. Transfer is accomplished by secure physical transport for direct data download or by highly secure, tamperproof electronic interface through super firewalls. The database entries are able of instantaneous access by means of indexing which allows authorities to retrieve information without search of the entire file. Alternatively, the entire file may be searched. Tracking of access and software to detect time and date of any chance is used to assure integrity of the originally recorded data.

Figure 3:
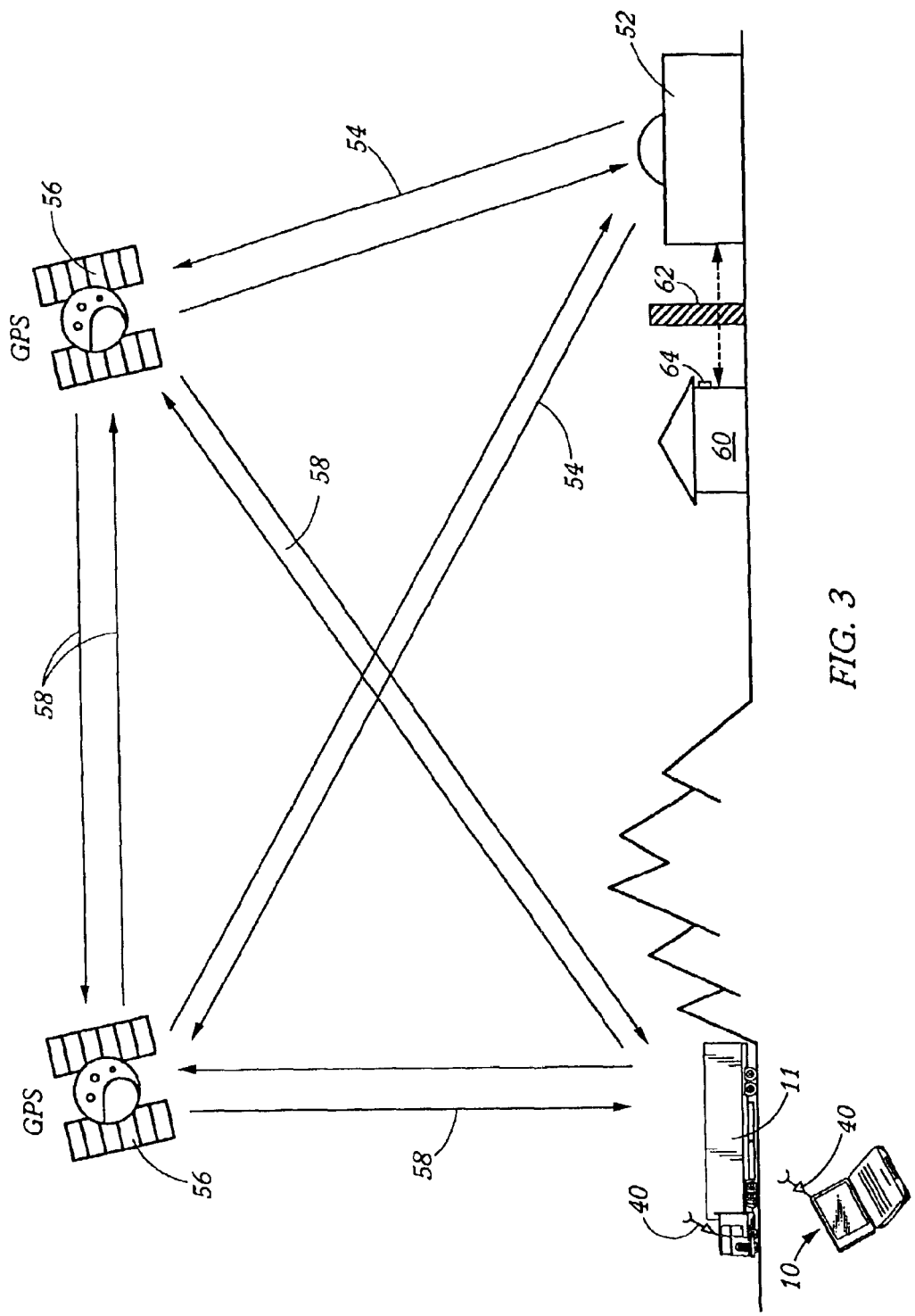
FIG. 3 is a conceptual diagram of an exemplary embodiment of the system of the instant invention using a GPS up/link down/link system.

Referring to FIG. 3, there is shown the relationship between the GPS satellite system, and the transceiver 40 located on the downloading device 10 and transceiver 52 located at a secure location. To transfer information into the system, transceiver 52 up/links by mimicking the L3 link by transmitting a signal 54 in the VHF/UHF band to the nearest satellite 56 in view. The signal 54 is an anti-jam, frequency-hopped transmission. Upon reception, the satellite 56 dehops and demodulates the signal 54, reformats and remodulates signal 54 and then transmits the signal 58 on for example the L3 link at 1381.05 MHZ. The satellite also re-transmits the signal 58 on a cross-link to other GPS satellites in order to effect global coverage. Cross-linked transmission signals 58 are down linked. Although the L3 link on the GPS navigation satellite system is contemplated as the best mode for communication between the transceiver 40 and the off-site location or authorities, hospitals and the like, other satellite systems are also anticipated as functioning in place of the GPS satellites 56, with the transceiver 52 suitably modified.

The system and method of downloading the secure information of the present invention becomes indispensable with respect to the Secure, Vehicle Mounted, Surveillance System. Specifically, thieves gaining access to a vehicle may ferret out the on board safe box containing the stored information and remove it. Additionally, in cases of car jacking, the thieves have control of the vehicle as well as the Secure, Vehicle Mounted, Surveillance System, making the probability of recovery of the information stored on the vehicle slight. Additionally, the ability of the instant invention to receive in real time the circumstances surrounding a vehicle after the theft is invaluable to the safety of law enforcement personnel. For example, officers will be able to ascertain whether a perpetrator is still lurking around the vehicle and if any one is armed.

Another advantageous aspect of the information gathering and transfer of the instant invention is the ability to immediately download information, either from a Recording System or directly from an information source such as a sensor or video sensing element such as a CCD element or an audio sensor on the monitored vehicle or site, and to transmit a secure copy of the downloaded information, via a transceiver communicating with a satellite or the like, to an offsite location for analysis by insurance adjusters and/or for use as evidence in court proceedings and/or for secure storage in an indexed, tamper proof, secure storage facility 60. In this manner, a repository of all information from various devices in various vehicles such as a hi-jacked plane, including ones involving a simultaneous event, such as a multi-car accident, can be securely stored in a single repository accessible by authorities and insurance adjusters so that a particular incident can be "reconstructed" in a side-by-side or frame-by-frame manner. The information can also be stored onto the downloading device's information storage means and a copy made in the devices back up information storage means, such that a tape or disk can be made of the incident for transport to, for example, a hospital.

It will be realized that other information may be gathered, encoded and stored in the synchronized information system, for example, GPS tracking information or the like. In this manner hijacked vehicles can be tracked, recovered or the site of an accident located and aircraft located in remote locations.

Once downloaded the information can be verified by use of stored information onboard vehicle 11, encrypted, indexed and integrated into a secure database for permanent storage in secure storage facility 60. Access to secure storage facility 60 is available electronically be means of super fire wall 62 or alternately by means of a secure physical download interface 64.

Figure 4:
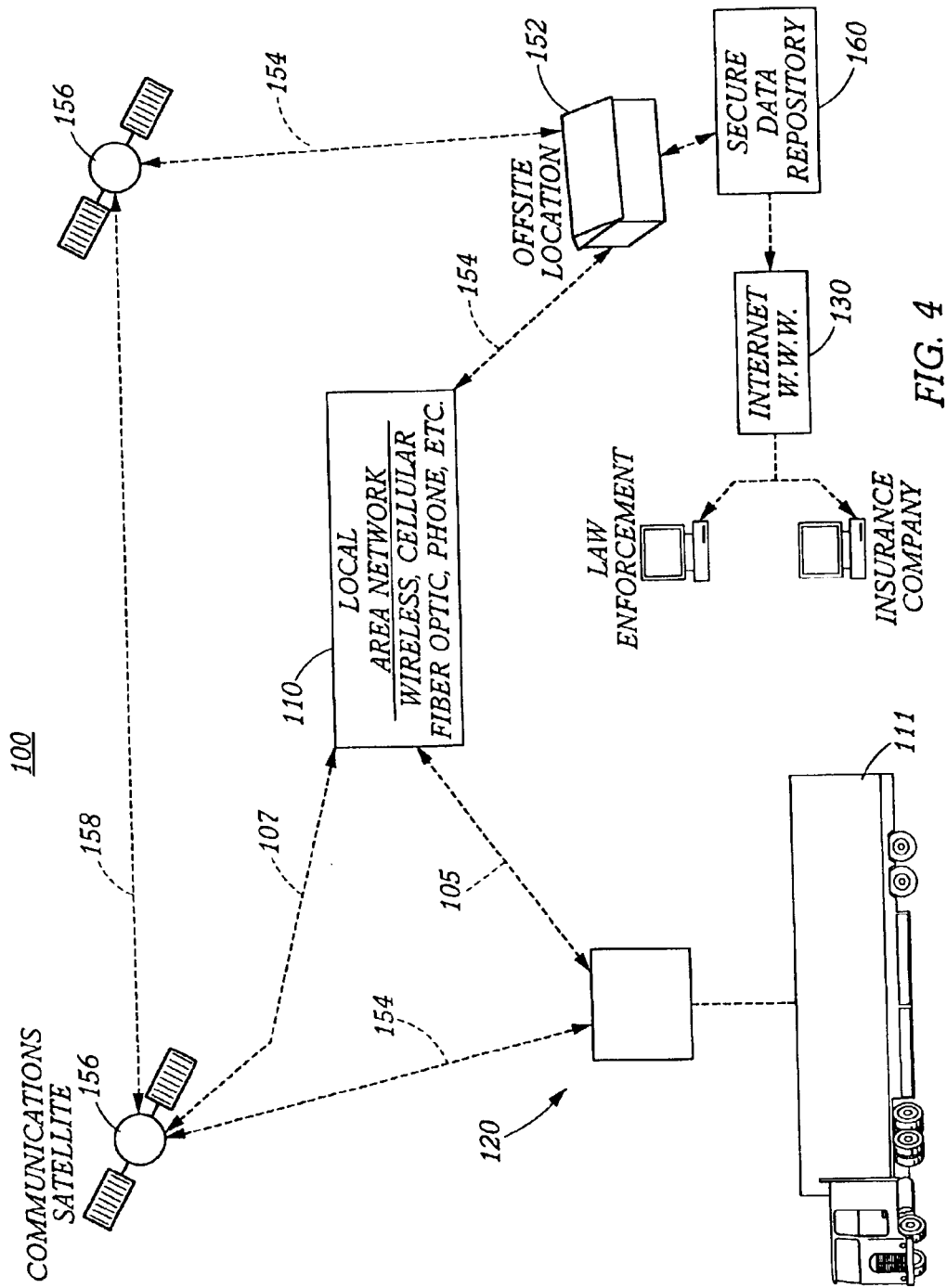
FIG. 4 is a conceptual diagram of a contemplated system interface with the secure repository of the instant invention.

Turning to FIG. 4, there is shown a system 100 for the integration of the system information into the indexed permanent database housed in the secure data repository 160. As shown, numerous links comprise the system 100 information flow network. Both a satellite network and a ground network with satellite interface are used to facilitate information transmittal in accordance with the instant embodiment. A satellite network of GPS satellites 156 with links 158 and 154 and a cellular/Internet (WAN/LAN) system 110 with links 105 are available for data transfer to the off-site location 152. The information is verified, indexed encoded and integrated into the permanent database housed in the secure data repository 160.

The satellite interface between the recording system 112 and off-site location 152 operates substantially as set forth above in FIG. 3. The cell wireless connection/Internet interface (LAN/WAN) system operates through links 105 between the recording system 112 and the off-site location 152. As previously set forth information traveling in this manner is encrypted and preferably digitized as previously set forth. Link 107 from the cellular wireless connection/Internet (LAN/WAN) system 110 provides an interface between the GPS satellite network and the cellular wireless connection/Internet (LAN/WAN) system 110 to provide a global network.

The mobile recording system as previously set forth comprises of an on-board incident recording system 112 equipped with a secure download devise as previously set forth. In this manner, information emanating from incident recording system 112, which is either stored or real-time, on board vehicle 111 (shown in this figure as a truck but represents any vehicle such as car, boat, ship, plane, helicopter, tank, troop carrier or the like) is conveyed to an off-site location 152.

It will be understood by the skilled artisan, that as shown in FIG. 2, remote access by police cruiser, ambulance, fire equipment or the like is available by interconnect with the system 100.

In accordance with the instant invention, information down linked to off-site location 152 is verified re-encrypted, indexed and integrated into a secure database and transferred to secure data repository 160 either electronically through a super fire wall (not shown) or physically by means of secure identification download (not shown). Once in place, the data in the database is a permanent, non-tamperable, information repository for use as evidence regarding environment, facts and circumstances surrounding the recorded incident. The information stored and indexed is available to law enforcement, insurance company and the like through for example, Internet connection 130 or any other available uplink means such as cellular, fiber optic LAN and/or satellite. The database can be searched almost instantaneously and is capable of providing a "chain of title" for evidence contained therein.

Although the present invention has been described with reference to preferred or exemplary embodiments, including particular materials and size parameters, those skilled in the art will recognize that various modifications and variations to the same can be accomplished without departing from the spirit and scope of the present invention and that such modifications are clearly contemplated herein. No limitation with respect to the specific embodiments disclosed herein and set forth in the appended claims is intended nor should any be inferred.

What is claimed is:

1. A system for producing an integrated database of data generated from a remote vehicle incident recording system comprising:
   a) at least one video camera for generating video signals of the incident proximate the vehicle;
   b) a recording device for capturing said video signals as data;
   c) an interface permitting input of an authorization code for accessing said data captured by said recording device, the captured data being inaccessible without the authorization code thereby securely maintaining the captured data as evidence of the incident;
   d) an information datalink for accessing data captured by said recording device;
   e) a transfer device coupled at least indirectly to said information datalink, the transfer device adapted to securely receive data from said remote vehicle incident recording system; and,
   f) means for generating an integrated, indexed database of data from said remote vehicle incident recording system wherein said means is coupled at least indirectly to said transfer device.

2. The device of claim 1 wherein said recording device is selected from the group consisting of a video tape drive, a hard disk drive, a CD ROM drive, and a solid state repository.

3. The device of claim 1 wherein said recording device is adapted to prevent said data from being overwritten for extended periods of time.

4. The device of claim 1 further comprising means for generating vehicle information in conjunction with said video signals for storage on said recording device as data.

5. The device of claim 4 wherein said data comprises identification information.

6. The device of claim 4 further comprising a display means for displaying said data.

7. The device of claim 4 wherein said data comprises audio information.

8. The device of claim 4 wherein said data comprises vehicle dynamic information.

9. The device of claim 4 wherein said data comprises vehicle control information.

10. The device of claim 1 wherein said information data link includes a download trigger for initiating downloading of information from said recording device.

11. The device of claim 10 wherein said download trigger is adapted to respond to the occurrence of a predetermined event.

12. The device of claim 10 wherein said download trigger is adapted to respond to transmitted instructions.

13. The device of claim 10 wherein said download trigger is adapted to require input of an electronic access code.

14. The device of claim 10 wherein said information data link is adapted to download encrypted information from said recording device.

15. The device of claim 10 wherein said information data link is a direct satellite up link/down-link.

16. The device of claim 1 wherein said transfer device provides a transmission trigger for initiating transmission of information to said means for generating an integrated, indexed database.

17. The device of claim 1 wherein the integrated database is indexed using at least one of the indexes selected from the group consisting of Vehicle Identification Number, Date of Accident/Incident, Owner's Name, Unit Serial Number, GPS Location, Street Names, Address of Incident, City Location of Accident, State Location of Accident, Vehicle Manufacturer, Vehicle Model, Vehicle Year, Insurer, Policy Number, Driver's License Number, Driver Name, Date of Last Access, Name of Last User, Company of Last User.

18. A system for producing an integrated database of data generated from a remote vehicle incident recording system comprising:
   a) at least one video camera for generating video signals of the incident proximate the vehicle;
   b) a recording device for capturing said video signals as data;
   c) an interface permitting input of an authorization code for accessing said data captured by said recording device, the captured data being inaccessible without the authorization code thereby securely maintaining the captured data as evidence of the incident;
   d) an information datalink for accessing data captured by said recording device;
   e) a transfer device coupled at least indirectly to said information datalink, the transfer device adapted to securely receive data from said remote vehicle incident recording system;
   f) means for generating an integrated indexed database of data from said remote vehicle incident recording system wherein said means is coupled at least indirectly to said transfer device; and
   g) a secure, tamper proof storage facility in secure communication with said means for permanently storing said integrated, indexed database.

19. The device of claim 18 wherein said recording device is selected from the group consisting of a video tape drive, a hard disk drive, a CD ROM drive, and a solid state repository.

20. The device of claim 18 wherein said recording device is adapted to prevent said data from being overwritten for extended periods of time.

21. The device of claim 18 further comprising means for generating vehicle information in conjunction with said video signals for storage on said recording device as data.

22. The device of claim 21 wherein said data comprises identification information.

23. The device of claim 21 further comprising a display means for displaying said data.

24. The device of claim 21 wherein said data comprises audio information.

25. The device of claim 21 wherein said data comprises vehicle dynamic information.

26. The device of claim 21 wherein said data comprises vehicle control information.

27. The device of claim 18 wherein said information data link includes a download trigger for initiating downloading of information from said recording device.

28. The device of claim 27 wherein said download trigger is adapted to respond to the occurrence of a predetermined event.

29. The device of claim 27 wherein said download trigger is adapted to respond to transmitted instructions.

30. The device of claim 27 wherein said download trigger is adapted to require input of an electronic access code.

31. The device of claim 18 wherein said information data link is adapted to download encrypted information from said recording device.

32. The device of claim 18 wherein said information data link is a direct satellite up-link/down-link.

33. The device of claim 18 wherein said transfer device provides a transmission trigger for initiating transmission of information to said means for generating an integrated, indexed database.

34. The device of claim 18 wherein the integrated database is indexed using at least one of the indexes selected from the group consisting of Vehicle Identification Number, Date of Accident/Incident, Owner's Name, Unit Serial Number, GPS Location, Street Names, Address of Incident, City Location of Accident, State Location of Accident, Vehicle Manufacturer, Vehicle Model, Vehicle Year, Insurer, Policy Number, Driver's License Number, Driver Name, Date of Last Access, Name of Last User, Company of Last User.

35. A method for capturing an incident proximate a vehicle, the method comprising:
    a) activating at least one video camera for generating video signals of the incident proximate to the vehicle;
    b) generating a video signal of the incident proximate to the vehicle;
    c) storing said video signal of the incident proximate to the vehicle on a large capacity recording device as data;
    d) providing an authorization code following storing of said data, the authorization code permitting access to the video signal stored on said large capacity recording device; accessing the data stored on said large capacity recording device, the stored video signal being inaccessible without the use of the authorization code thereby securely maintaining the captured video signals as evidence of the incident;
    e) transferring said data to a transfer device for securely receiving said data; and
    f) generating an integrated, indexed database of said data.

36. The method of claim 35 wherein said recording device is selected from the group consisting of a video tape drive, a hard disk drive, a CD ROM drive, and a solid state repository.

37. The method of claim 35 wherein said recording device is adapted to prevent said data from being overwritten for extended periods of time.

38. The method of claim 35 further comprising the further step of generating vehicle information in conjunction with said video signals for storage on said recording device as data.

39. The methods of claim 38 wherein said data comprises identification information.

40. The method of claim 38 further comprising displaying said data.

41. The method of claim 38 wherein said data comprises audio information.

42. The method of claim 38 wherein said data comprises vehicle dynamic information.

43. The method of claim 38 wherein said data comprises vehicle control information.

44. The method of claim 35 wherein said transferring is triggered to initiate downloading of information from said recording device.

45. The method of claim 35 wherein said transferring is in response to the occurrence of a predetermined event.

46. The method of claim 35 wherein said transferring is in response to transmitted instructions.

47. The method of claim 35 wherein said transferring is in response to input of an electronic access code.

48. The method of claim 35 wherein said transferring is of encrypted information from said recording device.

49. The method of claim 35 wherein said transferring is accomplished by a direct satellite up-link/down-link.

50. The method of claim 35 wherein said transferring is in response to a transmission trigger for initiating transmission of information for generating said integrated, indexed database.

51. The method of claim 35 wherein the integrated database is indexed using at least one of the indexes selected from the group consisting of Vehicle Identification Number, Date of Accident/Incident, Owner's Name, Unit Serial Number, GPS Location, Street Names, Address of Incident, City Location of Accident, State Location of Accident, Vehicle Manufacturer, Vehicle Model, Vehicle Year, Insurer, Policy Number, Driver's License Number, Driver Name, Date of Last Access, Name of Last User, Company of Last User.

52. A device for permanent, secure tamper proof storage of vehicle information from a vehicle incident recording system, the device comprising:
    a) at least one interface for accessing data from a remote vehicle incident recording system;
    b) an information datalink coupled to the at least one interface for receiving data from the remote vehicle incident recording system;
    c) a transfer device coupled at least indirectly to the information datalink, the transfer device adapted to securely receive data from the remote vehicle incident recording system and index said data for storage; and
    d) a secure, tamer proof storage facility, separate from said transfer device, but in secure communication with said transfer device, for permanently storing an indexed database of integrated data transferred from said remote vehicle to said transfer device.

53. The device of claim 52 further comprising information storage means far storing data transferred from said remote vehicle.

54. The device of claim 53 wherein said information storage means is selected from the group consisting of a video tape drive, a hard disk drive, a CD ROM drive, and a solid state repository.

55. The device of claim 53 wherein said information storage means is adapted to prevent said data from being overwritten for extended periods of time.

56. The device of claim 52 wherein said data comprises identification information.

57. The device of claim 52 wherein said data comprises video information.

58. The device of claim 52 further comprising a display means for displaying said data.

59. The device of claim 52 wherein said data comprises audio information.

60. The device of claim 52 wherein said data comprises vehicle dynamic information.

61. The device of claim 52 wherein said data comprises vehicle control information.

62. The device of claim 52 wherein said transceiver includes a download trigger for initiating downloading of data from said recording system.

63. The device of claim 62 wherein said download trigger is adapted to respond to the occurrence of a predetermined event.

64. The device of claim 62 wherein said download trigger is adapted to respond to transmitted instructions.

65. The device of claim 62 wherein said download trigger is adapted to require input of an electronic access code.

66. The device of claim 62 wherein said transceiver is adapted to download encrypted data from said recording system.

67. The device of claim 52 wherein said transmission link is a direct satellite up-link/down-link.

68. The device of claim 52 wherein said transceiver provides a transmission trigger for initiating transmission of data to an information storage device.

69. A method for permanently storing data from a recording system located on a vehicle in an indexed data base, comprising:
   a) activating a device having an interface for accessing data from a remote vehicle recording system;
   b) receiving data from the remote vehicle recording system;
   c) transmitting data from the remote vehicle recording system to a secure location separate from the device using a transceiver coupled to the device;
   d) indexing said data to form a database, and
   e) storing said database at said secure location to a permanent, secure, tamperproof device to form a permanent, non-tamperable indexed database.

70. The method of claim 69, said data comprising vehicle identification information.

71. The method of claim 69, said data comprising video information.

72. The method of claim 69, said data comprising audio information.

73. The method of claim 69, said data comprising time information.

74. The method of claim 69, said data comprising vehicle dynamic information.

75. The method of claim 69, said data comprising vehicle control information.

76. The method of claim 69, including the steps of transmitting said information to an off-site location.

77. The method of claim 69, said transmitting performed via transmission link.

78. The method of claim 77 wherein said transmission link is a satellite up-link/down-link.

79. The method of claim 69, including capturing and storing said data.

80. The method of claim 69, including storing said data remotely.

81. The method of claim 69, including capturing and storing said data on one or more of a video tape, a hard disk, a CD ROM, and a solid state repository.

82. The method of claim 69, including temporarily preventing said data from being overwritten.

83. The method of claim 69, including inputting an electronic access code.

* * * * *